United States Patent
Soja et al.

(10) Patent No.: US 9,389,793 B2
(45) Date of Patent: Jul. 12, 2016

(54) TRUSTED EXECUTION AND ACCESS PROTECTION FOR EMBEDDED MEMORY

(71) Applicant: Freescale Semiconductor, Inc., Austin, TX (US)

(72) Inventors: Richard Soja, Austin, TX (US); Nancy H. Amedeo, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 125 days.

(21) Appl. No.: 14/198,915

(22) Filed: Mar. 6, 2014

(65) Prior Publication Data

US 2015/0254017 A1    Sep. 10, 2015

(51) Int. Cl.
  *G06F 12/00* (2006.01)
  *G06F 3/06* (2006.01)
  *G06F 12/14* (2006.01)

(52) U.S. Cl.
  CPC ............ *G06F 3/0622* (2013.01); *G06F 3/0637* (2013.01); *G06F 3/0679* (2013.01); *G06F 12/1425* (2013.01); *G06F 2206/1014* (2013.01)

(58) Field of Classification Search
  None
  See application file for complete search history.

(56) References Cited

U.S. PATENT DOCUMENTS

| | | | |
|---|---|---|---|
| 5,764,995 A | 6/1998 | DeRoo et al. | |
| 6,986,052 B1* | 1/2006 | Mittal | G06F 12/1441 711/E12.097 |
| 2003/0140238 A1* | 7/2003 | Turkboylari | G06F 21/575 713/193 |
| 2004/0064723 A1 | 4/2004 | Barnes et al. | |
| 2008/0086769 A1* | 4/2008 | Conti | G06F 21/74 726/15 |
| 2009/0240923 A1 | 9/2009 | Covey et al. | |
| 2015/0046717 A1* | 2/2015 | Hagiwara | G06F 21/575 713/187 |

OTHER PUBLICATIONS

"ARM Security Technology—Building a Secure System using TrustZone® Technology," ARM, 108 pages, 2009.
"Programmable read-only memory," *Wikipedia*, 3 pages, Dec. 21, 2013.
"Firmware," *Wikipedia*, 5 pages, Jan. 28, 2014.
"ARM architecture," *Wikipedia*, 22 pages, Feb. 11, 2014.
"Open Virtualization—ARM TrustZone FAQ—Open Virtualization for ARM TrustZone," retrieved from http://www.openvirtualization.org/open-source-arm-trustzone.html , 6 pages, retrieved Mar. 9, 2014.

(Continued)

*Primary Examiner* — Baboucarr Faal (57) ABSTRACT

A semiconductor device includes, in various embodiments, a memory and a processor, with the processor configured to perform a permission check prior to execution of a memory-access instruction. The permission check comprises evaluating a permission attribute of the memory-access instruction and a permission attribute of a memory location to be accessed. The memory-access instruction is denied unless the permission attribute of the memory-access instruction is compatible with the permission attribute of the memory location to be accessed. In various embodiments, permission attributes are obtained by the processor from a one-time-programmable (OTP) memory module. In various embodiments, the permission attributes are determined based on a source address of the memory-access instruction and an address of the memory location to be accessed. In various embodiments, the OTP memory module stores permission settings that are based on the identity of suppliers for various portions of code stored in the memory.

20 Claims, 6 Drawing Sheets

(56) References Cited

OTHER PUBLICATIONS

"ARM—Development of TEE and Secure Monitor Code," retrieved from http://www.arm.com/products/processors/technologies/trustzone/tee-smc.php , 2 pages, retrieved Mar. 9, 2014.

"ARM—TrustZone," retrieved from http://www.arm.com/products/processors/technologies/trustzone , 7 pages, retrieved Mar. 9, 2014.

* cited by examiner

| Trust Attribute of Fetched Instruction | Protection Attribute of Target Address | Ld/St Allowed? |
|---|---|---|
| Trusted | Protected | Yes |
| Trusted | Unprotected | Yes |
| Untrusted | Protected | No |
| Untrusted | Unprotected | Yes |

| Trust Attribute of Fetched Instruction | Trust Attribute of Target Address | Branch Allowed? |
|---|---|---|
| Trusted | Trusted | Yes |
| Trusted | Untrusted | Yes |
| Untrusted | Trusted | No; return to trusted code by interrupt or exception handler |
| Untrusted | Untrusted | Yes |

TRUSTED EXECUTION AND ACCESS PROTECTION FOR EMBEDDED MEMORY

FIELD OF THE INVENTION

The present disclosure relates in general to semiconductor processors, and more specifically to protection against access or execution of inappropriate code in microcontroller devices.

BACKGROUND

Microcontrollers are widely used in devices that are expected to operate without the need for frequent updates to their basic behavior. Accordingly, microcontrollers have found widespread use in automotive control systems, toys, medical implants, consumer appliances, and other systems that need to operate on a long-term basis under a reliable control system.

In various applications, microcontrollers are designed with the ability to accept modifications to their internal firmware. These modifications may be needed, for example, to provide occasional upgrades or updates that address errors (e.g., correcting a security vulnerability or other bug) or add new features or compatibilities with evolving communications protocols. Thus updatability is an essential feature for providing support through the expected lifetime of many products.

BRIEF DESCRIPTION OF THE DRAWINGS

A skilled practitioner will appreciate the benefits, features, and advantages of the present disclosure with reference to the following description and accompanying drawings. The figures are not necessarily drawn to scale.

DETAILED DESCRIPTION

Microcontrollers are generally designed as a single integrated circuit package that has an embedded flash memory that holds the microcontroller's firmware, one or more central processing unit (CPU) cores that execute the instructions in the firmware, and input/output ports that are used for communicating with off-package devices. Many microcontrollers also include some random access memory (RAM), integration modules, and sub-components such as analog-to-digital converters, communications packages, and other internal components. In various situations, microcontrollers can be constructed using appropriate system-on-a-chip (SOC) design and manufacturing methods to create effectively a small computing system that executes instruction from the microcontroller's internally embedded firmware.

A variety of firmware programs can be installed on a microcontroller. For example, many microcontrollers include a low-level layer of instructions that are hardware dependent, such as memory drivers, communications drivers, and I/O drivers. One example of such low-level code is the microcontroller abstraction layer (MCAL) packages that support some degree of hardware independence for intermediate-layer and higher-layer instructions. Various customized drivers can also be used in addition to MCAL or other common packages. Intermediate-layer instructions can include memory support packages, communication support packages, and various intermediate abstraction packages. In various systems, a further intermediate layer, e.g., AUTOSAR (AUTomotive Open System ARchitecture) RTE provides a run time environment or other supporting environment for top-level applications packages. The applications packages can provide controlling operations that are designed for a particular product, such as game operations, vehicle systems control, operations in a television remote-control unit, support for computer components, or other operations.

The various packages stored in a microcontroller's firmware may be created by a variety of sources. One microcontroller may have firmware components that were written by five, twenty, or more sources such as original equipment manufacturers (OEMs), top-level component suppliers (e.g., tier 1 suppliers), lower-level suppliers (e.g., tier 2, tier 3) that provide their products through higher-level suppliers, run-time environment developers, peripheral developers, supporting developers, and other writers of the relevant firmware.

As the size and complexity of embedded firmware grows, there is an increasing concern for unreliable code being installed in a microcontroller. Problems may arise from faulty or malicious code being inadvertently installed during the initial manufacture of a microcontroller, or during an upgrade in which new code is loaded into the microcontroller. Experience shows that the monitoring and certification of firmware code helps avoid problematic firmware, but these measures are naturally not perfect guarantees of correct code. This concern is particularly significant for microcontrollers deployed in safety-related devices such as medical implants. And more generally, many microcontrollers hold proprietary instruction codes that can be misappropriated if a malicious reading routine is installed into another memory segment within the microcontroller. It would be helpful to have additional tools and procedures that can provide assistance, in various situations, for avoiding the effects of unreliable code in embedded firmware.

Figure 1:
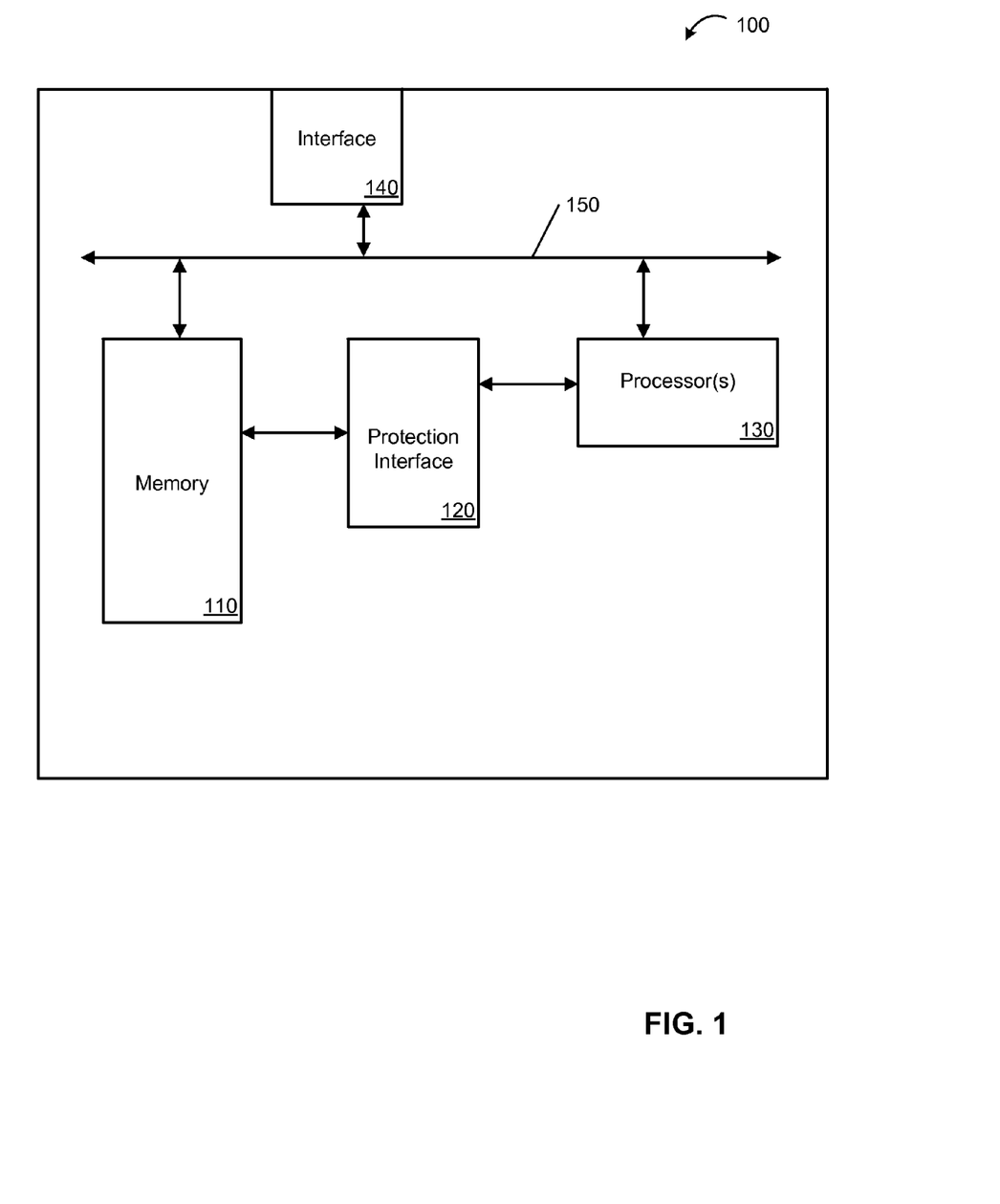
FIG. 1 shows one embodiment of a microcontroller configured to regulate the execution of various components of embedded code.

FIG. 1 shows one embodiment of a microcontroller 100 configured to regulate the execution of various components of embedded code. Microcontroller 100 includes memory 110, one or more processor(s) 130, a protection interface 120, input/output interfaces 140, and a communications bus 150. Microcontroller 100 is configured so that instructions are fetched from memory 110 into registers of processor 130 through protection interface 120. Similarly, microcontroller 100 is also configured so that load and store operations between memory 110 and processor 130 are conveyed through protection interface 120. The components 110, 120, 130, 140 are illustrated as separate single blocks in the example FIG. 1. In other implementations, these components may be present in other numbers and/or may be combined with each other. For example, protection interface 120 may be integrated into processor 130 or into memory 110. Similarly, memory 110 may include two or more separate memory components and/or processor 130 may include two or more cores, for example.

Figure 2:
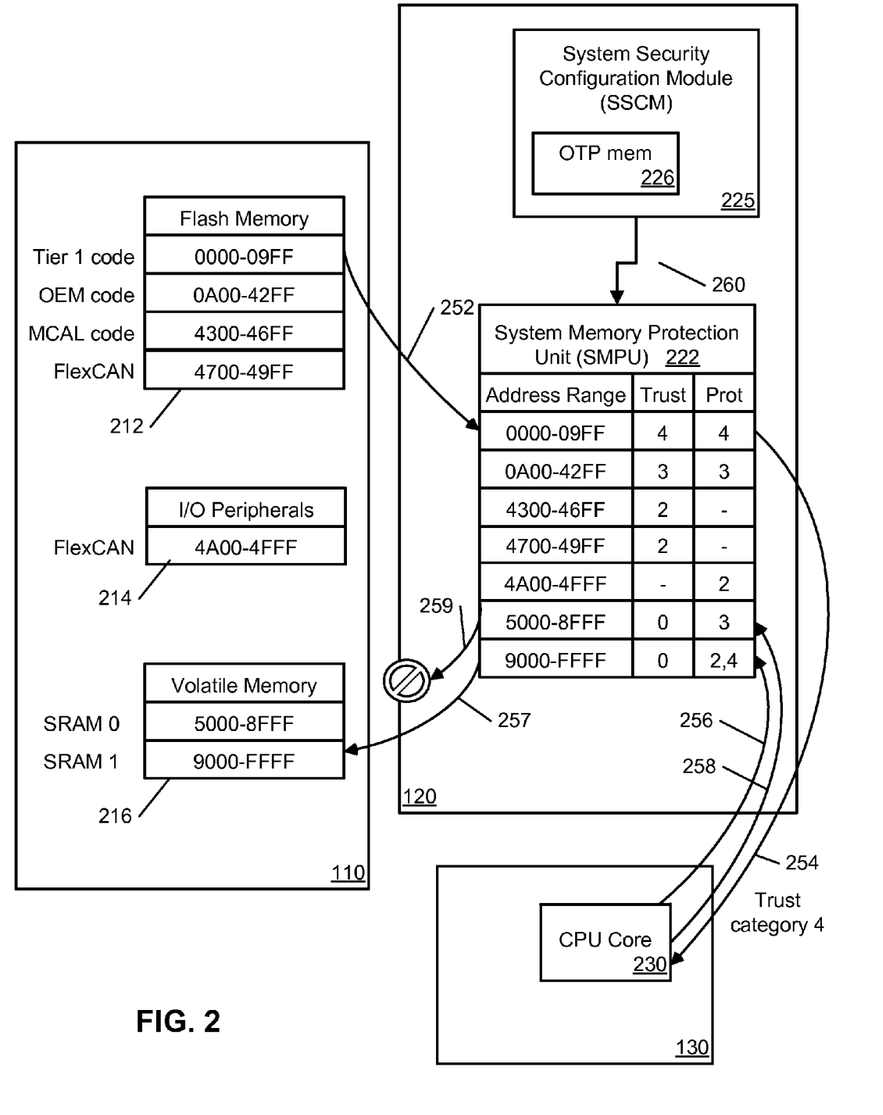
FIG. 2 shows one embodiment of communications between a processor and a memory.

FIG. 2 shows one embodiment of communications between processor 130 and memory 110. As illustrated, these communications are transmitted through protection interface 120.

In this example, memory 110 includes several different types of memory modules: a flash memory 212, I/O and peripherals ports 214, and a volatile memory 216. As illustrated, a set of memory addresses describe the various memory locations in memory 110. In this example, 16-bit addresses map the locations. In other examples, other sizes of addresses may be used, such as 4, 8, 16, 32, or 64-bit addresses.

Flash memory 212 is designated in this example to hold four different categories of firmware code. The categories are partitioned, in this example, according to the source or type of code. One address range is designated for firmware from a Tier 1 supplier. Another address range is reserved for OEM firmware. A third address range is allocated to MCAL supporting code. A fourth address range holds code for controlling off-chip components. This section of memory is loaded with FlexCAN (a flexible controller area network) firmware.

Volatile memory 216 is similarly divided into multiple sections. In this example, the volatile memory is static random-access memory (SRAM). One address range is designated as SRAM 0; another address range is designated as SRAM 1.

I/O and peripherals ports 214 hold interfaces for controlling off-chip components. This section of memory is an interface to hardware supported by the FlexCAN code. The address range in block 214 represents the location of control and data registers in the hardware.

Firmware suppliers generally take precautions to ensure that their code is correct and trustworthy. However, different suppliers typically use different measures to ensure their reliability. Moreover, during operation, a microcontroller's embedded memory may hold different types of data with different levels or categories of sensitivity. For these and other reasons, a manufacturer may wish to provide different types of access permissions to different components of code on a microcontroller.

In the illustrated example, permissions are assigned by a system memory protection unit (SMPU) 222 in protection interface 120. The SMPU designates code from different sections of memory as being assigned different categories of trustworthiness. SMPU also designates data in different sections of memory as warranting different categories of protection. In the illustration of FIG. 2, these designations are illustrated in a table that shows trust categories and protection categories for various ranges of addresses in the embedded memory. For example, code supplied by the OEM (stored in memory locations 0A00-42FF) are assigned a trust attribute of "category 3" in the illustrated table. The SMPU is configured to regulate this code so that the only load and store operations it can perform in the embedded memory are at memory locations with a matching category of protection. As illustrated, the OEM code (0A00-42FF) itself and SRAM 0 (5000-8FFF) are the only two sections of embedded memory that match, since they are the only sections that have a "category 3" protection attribute. The SMPU will disallow code from the OEM section to perform load or store operations on other address ranges in the embedded memory 110.

The curved arrows in FIG. 2 illustrate this protection operation. In this example, a central processing unit (CPU) core 230 in processor 130 fetches and executes an instruction from the Tier 1 code. The instruction is conveyed in a communication 252 from flash memory 212 to SMPU 222. SMPU 222 determines that this instruction is assigned a particular trust attribute. In the illustrated example, the determination is based on the address of the instruction, and the assigned trust attribute is "category 4". In a communication 254, the instruction is conveyed to CPU core 230 along with the trust attribute for the instruction.

CPU core 230 is configured to track the trust attribute of an instruction along with the instruction itself. In this example, the instruction causes CPU core 230 to request two load/store operations in volatile memory 216. The first load/store operation is targeted to an address in SRAM 1; the second load/store operation is targeted to an address in SRAM 0. As discussed below, only one of these two operations succeeds.

The first load/store operation is conveyed in a communication 256 back to SMPU 222. Communication 256 from CPU core 230 includes the instruction (e.g., a load instruction), the target address, and also the trust attribute of the instruction (trust category 4). Based on the target address, SMPU 222 determines that the load instruction is to be executed on data that is protected with a protection attribute of either "category 2" or "category 4", as shown in the illustrated table. The SMPU compares the trust attribute of the incoming instruction with the protection attribute of the target address. Since these attributes match (trust category 4 and protection category 4), SMPU 222 initiates a communication 257 that performs the instruction on the target address.

The second load/store operation is conveyed from CPU core 230 in a communication 258 back to SMPU 222. Communication 258 from CPU core 230 includes the instruction (e.g., a store instruction), the target address, and also the trust attribute of the instruction (trust attribute 4). Based on the target address, SMPU 222 determines that the store instruction is to be executed on data that is protected with a "category 3" protection attribute, as shown in the illustrated table. Again, the SMPU compares the trust attribute of the incoming instruction with the protection attribute of the target address. Since these attributes do not match (trust category 4 and protection category 3), SMPU 222 disallows a communication 259 from performing the instruction on the target address.

SMPU 222 is thus configured to regulate various instructions so that they can only be performed on permitted memory locations. In this example, the regulation is made possible, in part, by communications 254, 256, and 258, which each indicate the trust attribute of an instruction ("category 4") along with other communication between memory and CPU core 230 for that instruction. In other implementations, other types of communications or communications paths are possible. The regulation can nonetheless be enforced by configuring a CPU to bind a trust attribute (or other access attribute) to an instruction. In this sense, a CPU can inherit the access attribute of an instruction when the CPU fetches the instruction.

In the illustrated example, it can be seen that the Tier 1 code (with trust category 4) is provided access only to data within the same section of memory and to data in SRAM 1 in the embedded memory, since these are the only two sections in the embedded memory that have a matching protection (protection category 4). Similarly, it can be seen that data in SRAM 1 (with protection categories 2 and 4) can be accessed only by instructions from Tier 1 code, MCAL code, or FlexCAN code, since these are the only three sections in the embedded memory that have a matching trust attribute (trust category 2 or trust category 4).

This example also shows that instructions from the MCAL code and the FlexCAN code only have access to the FlexCAN register locations and SRAM 1 in the embedded memory. This is because the table in SMPU 222 designates the MCAL code (4300-46FF) and the FlexCAN code (4700-49FF) as having trust attribute of category 2, and the only matching target addresses are for the FlexCAN data (4A00-4FFF), with protection attributes of category 2, and the for the SRAM 1 (9000-FFFF), with protection attributes of category 2 or category 4. Moreover, the MCAL and FlexCAN codes are the only embedded firmware with access to the FlexCAN register locations (protection category 2), since they are the only codes designated with a matching attribute (trust category 2) in SMPU 222.

Moreover, the illustrated example allows any code from the embedded memory to access the MCAL data and FlexCAN data (stored in memory locations 4300-46FF and 4700-49FF), since SMPU 222 does not specify any protection attribute for these addresses. Conversely, SMPU 222 does not specify a trust attribute for memory locations 4A00-4FFF. This omission is because these locations are FlexCAN register locations, so this region of memory cannot execute code. Accordingly, no trust attribute is needed. (Moreover, by omitting a trust attribute for these locations, this example of SMPU 222 additionally safeguards protected memory from an erroneous condition in which an instruction purportedly originates from these locations.)

According to the table in SMPU 222, any software code or other instructions that may be stored in SRAM 0 and SRAM 1 (memory locations 5000-8FFF and 9000-FFFF) are designated as having trust attribute 0. However, these instructions would be denied access to any data in the embedded memory because the SMPU shows that no sections of the embedded memory have a matching protection attribute.

It is helpful to protect the information in SMPU 222 against inadvertent or malicious modifications, since this information includes the permissions table that regulates the code on the microcontroller. One approach is to "hard-wire" the permissions table into the microcontroller, e.g., by setting the access permissions during the design of the semiconductor logic in Verilog or another suitable hardware description language. This approach provides significant immunity from undesired protections. On the other hand, it prevents flexibility in use and configuration for different applications.

Another approach to protecting the permissions table is to use a module that loads the SMPU with the relevant permission attributes in a secure manner. The illustrated example includes a system security configuration module (SSCM) 225 that holds the relevant permissions information. The SSCM is protected with suitable hardware design techniques. In one implementation, SSCM 225 includes a one-time programmable (OTP) flash memory 226. After manufacture of the microcontroller, trust and protection attributes for various address ranges are written into OTP flash memory 226 based on the expected use of the microcontroller. Trust attributes, protection attributes, or other permissions can be written into OTP flash memory 226, for example as records of a Device Configuration File (DCF) or in another suitable format. Once the OTP flash memory 226 has been configured with permission settings, the OTP hardware physically prevents overwriting of the permissions settings. In various implementations, an OTP flash memory is a semiconductor component that can accept one write operation during the lifetime of the device, and has no mechanism for receiving an erase or overwrite operation. In various environments, the permissions settings are inserted into OTP memory as part of a configuration event by the OEM, rather than as part of programming events that can be performed during subsequent operation.

The microcontroller is configured so that the permissions settings are loaded from SSCM 225 into SMPU 222 in a secure manner. For example, protection interface 120 can be configured so that a communication 260 occurs at each reset or power-up, copying or otherwise loading the permissions settings from SSCM 225 into SMPU 222. This loading can be protected, for example, by using write-once registers in SMPU 222. The write-once hardware prevents any overwriting of these registers until the next power-up reset or other reset of the microcontroller, at which time the reset procedure will automatically reload the permissions using communication 260. For example, the hardware of a microcontroller can be designed not to provide any access by software to these registers. Alternatively, or in addition, the registers may be designed so that once they have been written, they can no longer respond to subsequent writes until reset.

After OTP flash memory 226 has been configured, the microcontroller can be loaded with appropriate firmware by the relevant parties (Tier 1, OEM, and other firmware designers, vendors, or suppliers). Various cryptography-based, hardware-based, or law-based protections, or combinations thereof, can be employed to ensure that parties cannot or may not insert code into unauthorized sections of the embedded memory. For example, external access to different sections of the flash memory 212 can be protected by different cryptographic keys, each of which is available only to a corresponding software or firmware provider. For example, a Tier 1 configuration tool may be equipped with a security key that enables programming of an appropriate section of an embedded memory (e.g., designated as a "Tier 1" region by SSCM 225 or SMPU 222), but does not provide access to other sections of the embedded memory.

A variety of alternate configurations are contemplated. In various implementations, SMPU 222 is partly or wholly integrated with processor 130, and the write-once registers of SMPU 222 (which are loaded with permissions information at reset) are among the registers in CPU core 230. In the example of FIG. 2, SSCM 225 is a component of the protection interface 120. In other embodiments, the configuring module can be considered as a separate component of the microcontroller. In general, it may be helpful to construct memory 110, SMPU 222, SSCM 225, and CPU core 230 (or corresponding elements) in a single integrated circuit, so that a malicious party cannot readily access interconnects among these components.

Trust attributes, protection attributes, and other permission attributes or security attributes can be allocated based on a variety of factors. In the example of FIG. 2, various codes stored in flash memory 212 are allocated trust attributes that corresponded to the vendors or other sources of the respective codes (Tier 1 supplier, OEM, etc.). In other examples, attributes can be partitioned based on other factors, such as security, safety, priority, cost, customer identity, user identity, user privilege, or other factors, or combinations thereof. For example, an access attribute may indicate a combination of a security category and a safety category. In one implementation, an access attribute is a six-bit identifier that encodes one of twelve security categories (e.g., based on supplier identity and/or various security certifications) and one of five safety categories (e.g., a designation from ISO 26262 such as Quality Management, Automotive Safety Integrity Level (ASIL) A, ASIL B, ASIL C, ASIL D). An instruction is granted access to a memory location only if the access attribute of the instruction matches (or is otherwise compatible with) the access attribute of the memory location.

Figure 3:
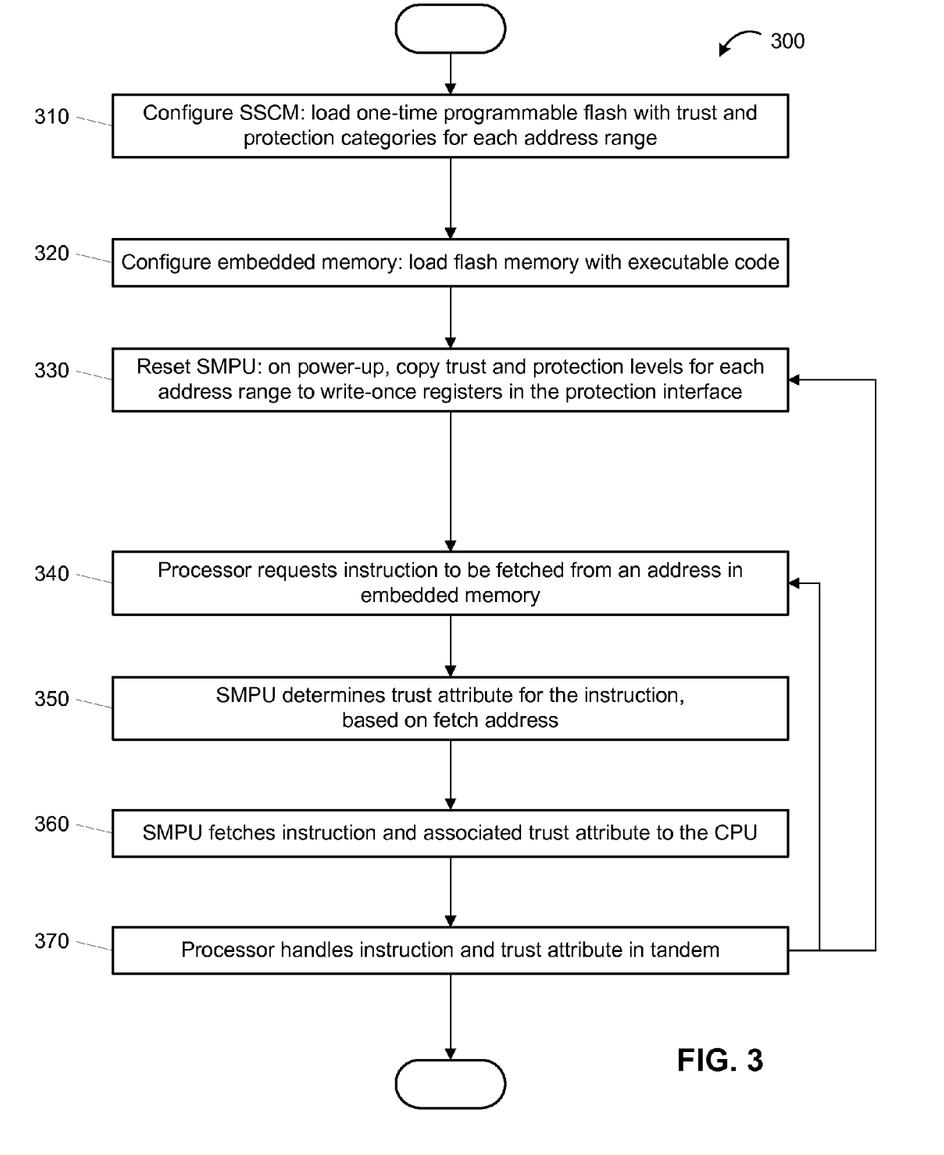
FIG. 3 shows one implementation of a procedure for protecting access to memory in a semiconductor device.

FIG. 3 shows one implementation of a procedure 300 for protecting access to memory in a semiconductor device. In various implementations, procedure 300 may employ devices or components such as those discussed above with respect to FIGS. 1 and 2.

The procedure starts in act 310, where access permissions are securely loaded onto a semiconductor device as part of an initial configuration operation.

In the example of FIG. 3, various locations in an on-chip memory are assigned trust attributes for instructions that will be stored in those locations. Similarly, various locations are assigned protection categories for data that will be stored in those locations. These assignments are performed once during the lifetime of the semiconductor device, during an initial configuration operation. For example, the access permissions can be loaded into a one-time programmable flash (e.g., in SSCM 225) by a manufacturer, immediately after or shortly after the semiconductor device has been manufactured. In various embodiments, each location in an embedded memory is assigned one or more protection attributes and one or more trust attributes.

In act 320, the semiconductor device is further configured by loading executable code into a flash memory or other non-volatile memory. This configuration can be performed all at once, or in several steps. For example, a several different load operations may each install firmware with different categories of permissions. Each load operation may have access to different sections of the memory, based on cryptographic restrictions or other restrictions. The various access permissions from act 310 will then designate regulations on the corresponding components of the code loaded in act 320. Similarly, the access permissions may additionally apply to hard-wired routines in the semiconductor device (e.g., in an on-chip read-only memory (ROM) module).

In act 330, the semiconductor device undergoes a reset operation that involves transferring the access permissions to write-once registers.

In the example of FIG. 3, the write-once registers are part of a protection interface (e.g., SMPU 222) that regulates communications between an on-chip processor and an on-chip memory in the semiconductor device. The write-once registers in the protection interface correspond to memory ranges in the on-chip memory. The write-once registers are loaded in act 330 with the trust and protection attributes for their respective memory ranges. The semiconductor device is configured so that the transfer in act 330 is repeated as part of each power-up procedure or reset procedure. Additional measures may also be used to further ensure that the transfer in act 330 precedes any operation that could insert malicious or otherwise undesirable values into the write-once registers.

In act 340, a CPU core or other processor initiates a fetch for an instruction from a memory.

In the example of FIG. 3, the on-chip processor determines an address for an instruction to be executed (e.g., using a program counter, threading algorithms, and/or other machine architecture protocols). The address refers to a location in the on-chip memory that is covered by the access permissions.

In act 350, the write-once registers are referenced to determine a trust attribute for the instruction being fetched.

In this example, the write-once registers are included in a protection interface (e.g., SMPU 222). The trust attributes for an instruction are based on the location from which the instruction is fetched. In act 350, the trust attribute for an instruction is read from the write-once register(s) that correspond to the memory range from which the instruction is fetched. In other implementations, the trust attributes may be based on other factors, such as a token, signature, or other indicator associated with the code being fetched.

In act 360, the fetched instruction is provided to the processor, along with the trust attribute of the instruction. The processor then keeps track of the trust attribute associated with the instruction. The instruction is then executed by the processor in act 370, with deference to the trust attribute. For example, if the trust attribute is insufficient for the operation to be performed by the instruction, the instruction is not executed. If the instruction is not executed, an exception handler or other procedure can be invoked for further operation.

Procedure 300 then loops back to act 340 to fetch a new instruction for execution. After power cycling or other reset operations, procedure 300 returns to act 330 to reload the access permissions into write-once registers.

Examples are shown in FIGS. 4-8 of the use of access permissions for regulating the execution of instructions by a processor. In various implementations, the procedures shown FIGS. 5 and 8 can be used as components of act 370 from FIG. 3.

Figure 4:
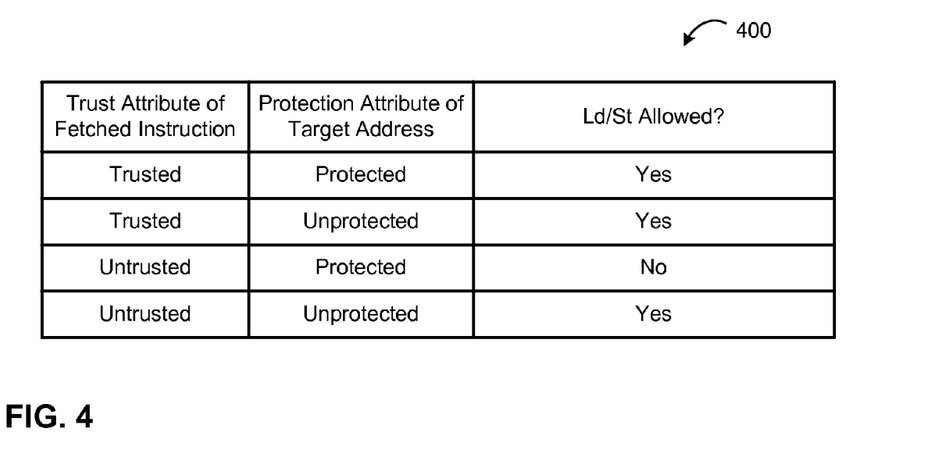
FIG. 4 illustrates a simple example of access permissions that can be used with load and store instructions.

FIG. 4 illustrates a simple example of access permissions that can be used with load and store instructions. In this example, a table 400 shows that each load/store instruction is assigned a binary trust attribute: trusted or untrusted. Similarly, table 400 shows that each possible target address of the load/store instruction is assigned a binary protection attribute: protected or unprotected. The load/store instruction is allowed unless it is an untrusted instruction being applied to a protected address.

Other examples of the trust and protection attributes are also contemplated. For example, a family of binary attributes can be used, with each attribute applicable to one of several categories of permission. As discussed above with respect to FIG. 2, each instruction can have several binary attributes, indicating whether the instruction is trusted or untrusted for category 1 access, trusted or untrusted for category 2 access, trusted or untrusted for category 3 access, etc. Similarly, memory locations can be assigned several binary attributes, indicating whether the instruction is protected or unprotected for category 1 access, protected or unprotected for category 2 access, protected or unprotected for category 3 access, etc. As a another example, protection levels can be used instead of protection categories: an instruction will be executed only if it has a trust attribute at a level that matches or exceeds the protection attribute level assigned to the target memory location. As yet another example, different sets of permissions may be used for load instructions than for store instructions.

Figure 5:
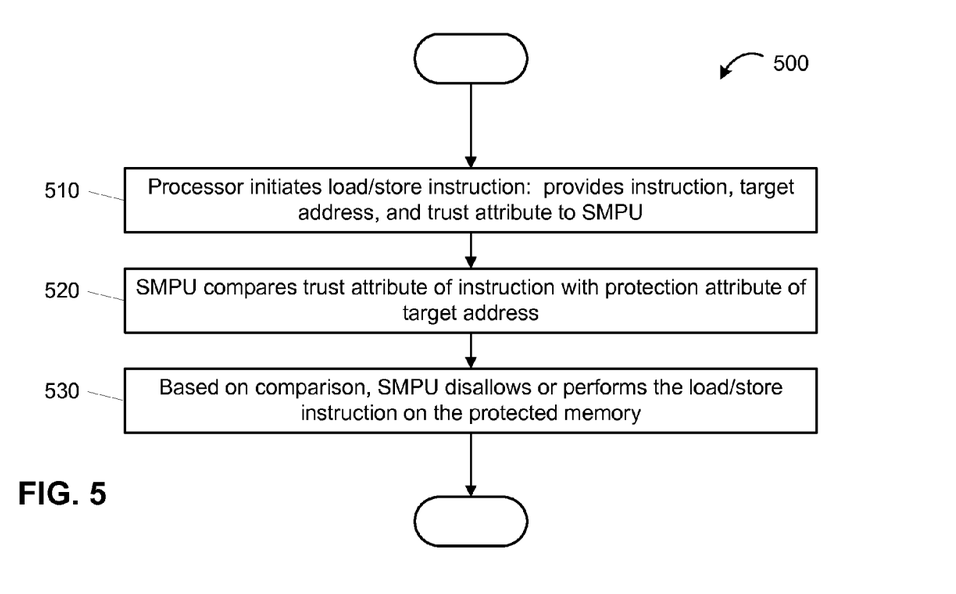
FIG. 5 shows one implementation of a procedure for regulating load and store instructions.

FIG. 5 shows one implementation of a procedure 500 for regulating load and store instructions. In this procedure, a CPU core or other processor attempts to execute a load/store instruction with an associated trust attribute. In act 510, the processor provides the instruction, the address of the target data, and the trust attribute of the instruction to an interface (e.g. SMPU 222). In act 520, the interface looks up a protection attribute of the target data and compares that protection attribute to the trust attribute of the instruction. In this example, the protection attribute is based on the address where the target data is stored. In various implementations, protection attributes are assigned to blocks of memory addresses. The size of the block with which the attribute is associated can depends on a design-consideration trade-off between granularity and cost of supporting a large number of attribute regions. For example, the size of the block range can be, in some implementations, the range of block sizes available in a relevant flash memory technology, such as 55 nm flash memory technology. (In other examples, the protection attribute may be assigned to individual addresses or based on other factors, such as a flag, signature, or other indicator associated with the target data.)

In act 530, the interface either allows or disallows the execution of the instruction. If the trust attribute of the instruction is compatible with the protection attribute of the target data, the load/store instruction is executed. Otherwise, the load/store instruction is not executed. If the instruction is not executed, an exception handler or other monitor or interrupt or recovery procedure can be invoked for further operation.

Figure 6:
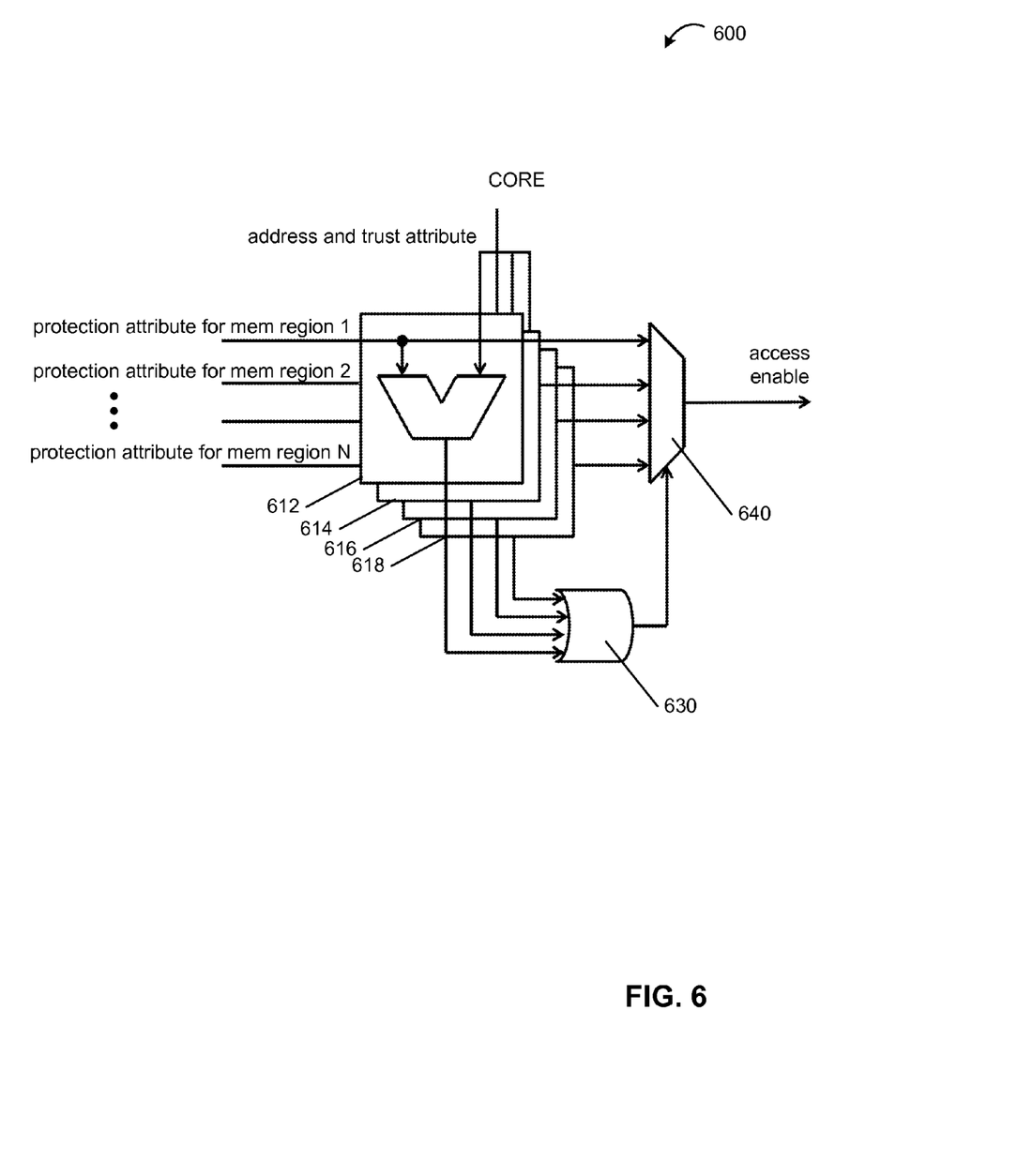
FIG. 6 shows one example of a circuit component for regulating access to protected memory.

FIG. 6 shows one example of a circuit component 600 for regulating access to protected memory. Circuit component 600 can be deployed, for example, in some implementations of SMPU 222. Circuit component 600 includes several comparators (in this example, four comparators) 612, 614, 616, 618, a combiner 630, and a multiplexer 640.

Each of the comparators 612, 614, 616, 618 is configured to receive a signal from a CPU core, indicating a trust attribute of a load/store instruction. In the illustrated example, the architecture is configured so that the trust attribute accompanies the instruction and the target address. When the instruction is fetched from memory, its associated trust attribute is also fetched, and is kept coherent with the instruction. Each of the comparators corresponds to a respective region of protected memory. Each comparator also receives the protection attribute for the corresponding region of protected memory. Each comparator compares the trust attribute received from the CPU core against the associated protection attribute, and outputs a signal indicating whether the trust attribute matches (or is otherwise compatible with) the protection attribute. The outputs from the comparators are provided to combiner 630, which merges these outputs into a control signal. The control signal is provided to multiplexer 640.

Multiplexer 640 also receives the protection attributes for the various memory regions. Multiplexer 640 passes along, as an output, the matching protection attributes based on the control signal from combiner 630. The output of multiplexer 640 is used to determine whether or not the current instruction from the CPU core is allowed or disallowed. In various implementations, the output signal is a binary signal that enables or disables access to the protected memory for the current instruction.

Figure 7:
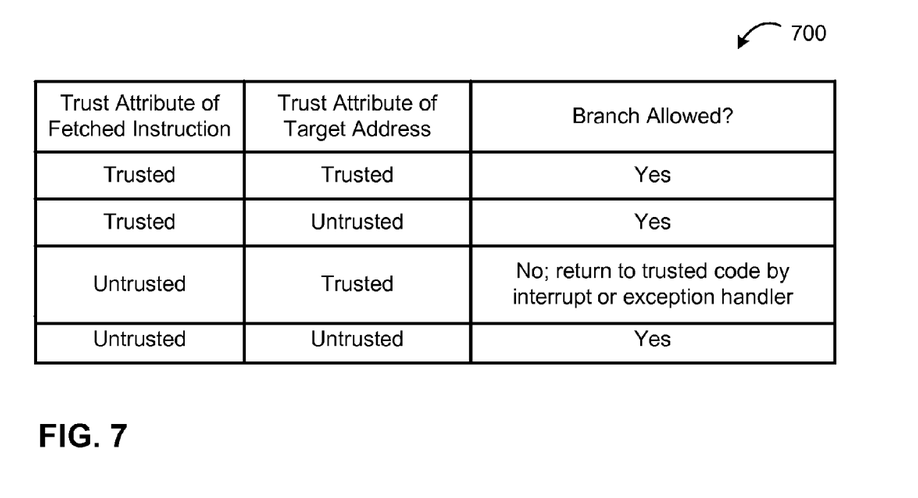
FIG. 7 illustrates a simple example of access permissions that can be used with branching instructions.
Figure 8:
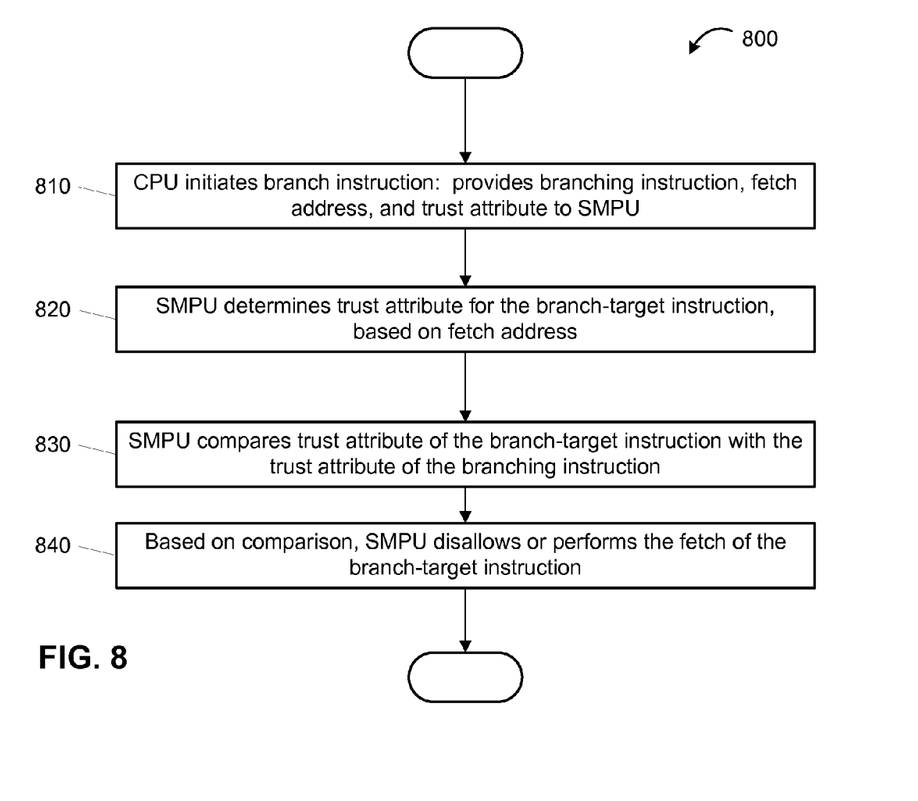
FIG. 8 shows one implementation of a procedure for regulating branching instructions.

In addition to directly accessing memory through load/store instructions, processors in a load/store architecture typically also can access memory indirectly, using branching instructions. FIGS. 7-8 illustrate procedures for determining whether or not to allow a branching instruction that potentially targets addresses in a protected memory.

FIG. 7 illustrates a simple example of access permissions that can be used with branching instructions. In this example, a table 700 shows that each branching instruction is assigned a binary trust attribute: trusted or untrusted. Similarly, table 700 shows that each possible target address of the branching instruction is also assigned a binary trust attribute: trusted or untrusted. The branching instruction is allowed unless it is an untrusted instruction being applied to a trusted address. (As discussed above, other examples of the trust attributes are also contemplated.)

FIG. 8 shows one implementation of a procedure 800 for regulating branching instructions. In this procedure, a CPU core or other processor attempts to execute a branching instruction with an associated trust attribute. In act 810, the processor provides the branching instruction, the address from which the target instruction is to be fetched, and the trust attribute of the branching instruction to an interface (e.g. SMPU 222). In act 820, the interface looks up a trust attribute of the target instruction. In act 830, the interface compares the trust attribute of the target instruction to the trust attribute of the branching instruction. In this example, the trust attribute of the target instruction is based on the address from where the target instruction is to be fetched. In various implementations, trust attributes are assigned to blocks of memory addresses. The size of the block with which the attribute is associated can depends on a design-consideration trade-off between granularity and cost of supporting a large number of attribute regions. For example, the size of the block range can be, in some implementations, the range of block sizes available in a relevant flash memory technology, such as 55 nm flash memory technology. (In other examples, the trust attribute of the target instruction may be assigned to individual addresses or based on other factors, such as a flag, signature, or other indicator associated with the target instruction.)

In act 840, the interface either allows or disallows the execution of the branching instruction. If the trust attribute of the branching instruction is compatible with the trust attribute of the target instruction, the branching instruction is executed. Otherwise, the branching instruction is not executed. If the branching instruction is not executed, an exception handler or other monitor or interrupt or recovery procedure can be invoked for further operation.

The tools and techniques described above may be helpful in a variety of situations. For example, OEM and integration service providers often try to strengthen their products with features that prevent the execution of malicious code. In addition, it can also be helpful to implement features that can prevent various types of harm from any malicious code that does succeed in executing. In various implementations, a processor can be designed to implement, in hardware, attributes of trust and protection for physical memory blocks, such as embedded flash and embedded RAM. An architecture that uses trust attributes, protection attributes, and/or other security attributes to regulate the access of various codes to various stored information, such as described above, can prevent or mitigate the effects of undesired code execution.

For example, malicious code or erroneous code may be injected into a RAM memory on a microcontroller. In one scenario, if an automotive diagnostic computer is compromised, it may load a malicious code into the RAM of an engine control unit (ECU) when the ECU is connected for a diagnostic evaluation or for an upgrade. Trust and protection attributes may be used to limit the access that is granted to code executing from RAM. In various situations, one benefit of these hardware-implemented attributes may be the prevention of access (directly or indirectly) to control registers or other memory locations that could transiently or permanently change the state of a microcontroller or other semiconductor device. Another benefit, in various situations, is the block of a malicious code from gaining inappropriate access to a flash image. This blocking may help prevent theft by a malicious code that would otherwise read the memory space of the target image and export it to an external device.

As another example, a malicious program may be installed as Trojan code in a microcontroller's nonvolatile memory. The malicious program may reside surreptitiously within a trusted code that was provided by a firmware supplier for loading into a portion of the embedded memory. The Trojan code may evade detection, for example, by remaining inactive until some date marker or cumulative event marker occurs. By restricting the access granted to code from the firmware supplier, hardware-implemented access attributes may limit the access that is granted to this malicious code when it is executed.

As a third example, a processor may be used in various situations to partition the operations of different non-malicious programs, or groups of programs. In one implementation, trust attributes and protection attributes (or other partitioning attributes) may be used to implement a hypervisor, which allows portions of an embedded memory to be shared among several concurrently-executing operating systems (or other low-level codes) in a microcontroller or other semiconductor device.

A variety of implementations are envisioned for a microcontroller that regulates access to data stored in embedded memory. In one implementation, when an instruction is fetched from a memory, an associated trust attribute is also fetched and is coherently kept with the instruction. (For cached systems, a cache line may support the storage of a trust-attribute tag.) Trust attributes may be initially stored onto the microcontroller by some secure and/or certified process into one-time programmable memory such as OTP flash or fusable links. During reset the trust attributes and protection attributes are moved to write-once locations associated with corresponding flash memory regions. When a processor fetches an instruction from a memory location, it also fetches the trust status of the instruction. Before the instruction is executed, its trust attribute is compared with the protection status of the memory location being accessed. If the memory location has a protection attribute that is compatible with the trust attribute of the instruction, the then the instruction is executed. Otherwise, the instruction is not executed. In some implementations, untrusted instructions can only access memory regions that are marked as unprotected, while trusted instructions can access memory regions that are marked as protected or unprotected.

It is to be understood that the architectures depicted herein are merely exemplary, and that in fact many other architectures can be implemented that use the techniques described herein. In various implementations, the illustrated elements of systems disclosed herein are circuitry located on a single integrated circuit or within a same device. Alternatively, some features of these systems may include any number of separate integrated circuits or separate devices interconnected with each other. Also for example, a system or portions thereof may be soft or code representations of physical circuitry or of logical representations convertible into physical circuitry. As such, a system may be embodied in a hardware description language of any appropriate type.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the present disclosure has been described in considerable detail with reference to certain preferred versions thereof, other versions and variations are possible and contemplated. Those skilled in the art should appreciate that they can readily use the disclosed conception and specific embodiments as a basis for designing or modifying other structures for carrying out the same purposes of the present disclosure without departing from the spirit and scope of the disclosure as defined by the appended claims.

What is claimed is:

1. A method comprising:
retrieving an instruction from a first memory address in memory;
determining a trust attribute that is associated with the instruction, wherein the trust attribute is one of a plurality of trust attributes stored in a one-time programmable (OTP) memory module;
identifying a second memory address in the memory to be accessed by a processor executing the instruction;
determining a protection attribute that is associated with of the second memory address, based at least upon the second memory address, wherein the protection attribute is one of a plurality of protection attributes stored in the OTP memory module;
comparing the trust attribute and the protection attribute; and
allowing execution of the instruction by the processor in response to a determination that the protection attribute of the second memory address is compatible with the trust attribute of the instruction.

2. The method of claim 1, wherein:
the trust attribute is determined to be associated with the instruction based upon the trust attribute being associated with the first memory address.

3. The method of claim 1, wherein:
the trust attribute is the determined to be associated with the instruction based upon the trust attribute being associated with a range of memory addresses that includes the first memory address.

4. The method of claim 1, wherein:
the instruction is a firmware instruction,
the instruction has a type that is one of a group comprising: a load instruction type, a store instruction type, and a branch instruction type, and
the trust attribute is determined to be associated with the instruction based upon the type of the instruction.

5. The method of claim 1, wherein the trust attribute of the instruction and the protection attribute of the second memory address each comprise security information stored in the one-time programmable (OTP) memory module.

6. The method of claim 5, comprising:
fabricating the OTP memory module, the memory, and the processor onto a semiconductor substrate; and
loading the security information into the OTP memory module during a secure write operation period that immediately follows the fabricating, wherein the OTP memory module does not accept erase operations or overwrite operations.

7. The method of claim 6, wherein:
the OTP memory module is configured to receive a first set of security information for a first set of memory addresses;
the OTP memory module is configured to receive the first set of security information from a first supplier under a first configuration procedure;
the OTP memory module is configured to receive a second set of security information for a second set of memory addresses; and
the OTP memory module is configured to receive the second set of security information from a second supplier under a second configuration procedure, wherein the first supplier is not authorized for the second configuration procedure.

8. The method of claim 5, wherein:
the security information comprises at least one of a group comprising: a vendor identifier, a security category, a safety category, a priority category, a cost category, a customer identity, a user identify, user privilege, a token, a signature, and an indicator associated with the instruction.

9. The method of claim 1, wherein:
the determination that the protection attribute is compatible with the trust attribute comprises a determination that a protection category identifier of the protection attribute matches a trust category identifier of the trust attribute, and
execution of the instruction is disallowed when the protection category identifier does not match the trust category identifier.

10. The method of claim 1, wherein:
the determination that the protection attribute is compatible with the trust attribute comprises a determination that a trust level of the trust attribute matches or exceeds a protection level of the protection attribute, and
execution of the instruction is disallowed when the trust level is less than the protection level.

11. The method of claim 1, wherein:
the protection attribute is associated with a range of memory addresses that includes the second memory address.

12. A system comprising:
a memory disposed on a semiconductor substrate;
a processor disposed on the semiconductor substrate; and
a protection interface configured between the memory and the processor, wherein the protection interface comprises a one-time programmable (OTP) memory module, the protection interface is configured to:
  determine a trust attribute that is associated with an instruction fetched from the memory, wherein the trust attribute is one of memory module, a plurality of trust attributes stored in the OTP memory module,
  determine a target address in the memory that is targeted by the instruction,
  determine a protection attribute that is associated with the target address, wherein the protection attribute is one of a plurality of protection attributes stored in the OTP memory module,
  compare the trust attribute and the protection attribute, and
  allow execution of the instruction by the processor in response to a determination that the trust attribute is compatible with the protection attribute.

13. The system of claim 12, wherein:
the protection interface further comprises a plurality of write-once registers that are configured to be written only once during a startup operation of the system;
the protection interface is configured to load the plurality of trust attributes and the plurality of protection attributes from the OTP memory module into the write-once registers during the startup operation; and
the protection interface is configured to obtain the trust attribute and the protection attribute from the write-once registers at a time after the a startup operation.

14. The system of claim 12, wherein the processor is configured to:
initiate an exception handling routine if the trust attribute is incompatible with the protection attribute.

15. The system of claim 12, wherein:
the instruction comprises a branching instruction, and
the target address indicates a location of a target instruction to be fetched.

16. The system of claim 12, wherein:
the instruction comprises one of a load instruction and a store instruction, and
the target address indicates a target data location that is targeted by the instruction.

17. The system of claim 12, wherein:
the protection interface is integrated into the processor.

18. A method comprising:
fetching an instruction from a memory to a processor;
determining a first permission attribute that is associated with the instruction, wherein the first permission attribute is one of a plurality of permission attributes stored in a protected section of memory;
determining a target address in the memory targeted by the instruction;
determining a second permission attribute that is associated with the target address, wherein the second permission attribute is one of the plurality of permission attributes stored in the protected section of memory;
granting access to the target address, by the processor, only if the first permission attribute of the instruction is compatible with the second permission attribute of the target address.

19. The method of claim 18, wherein:
the first permission attribute is determined to be associated with the instruction based upon the first permission attribute being associated with an address of the instruction.

20. The method of claim 18, wherein:
the memory and the processor are comprised within a system-on-a-chip semiconductor device.

\* \* \* \* \*